Figures 1, 4:
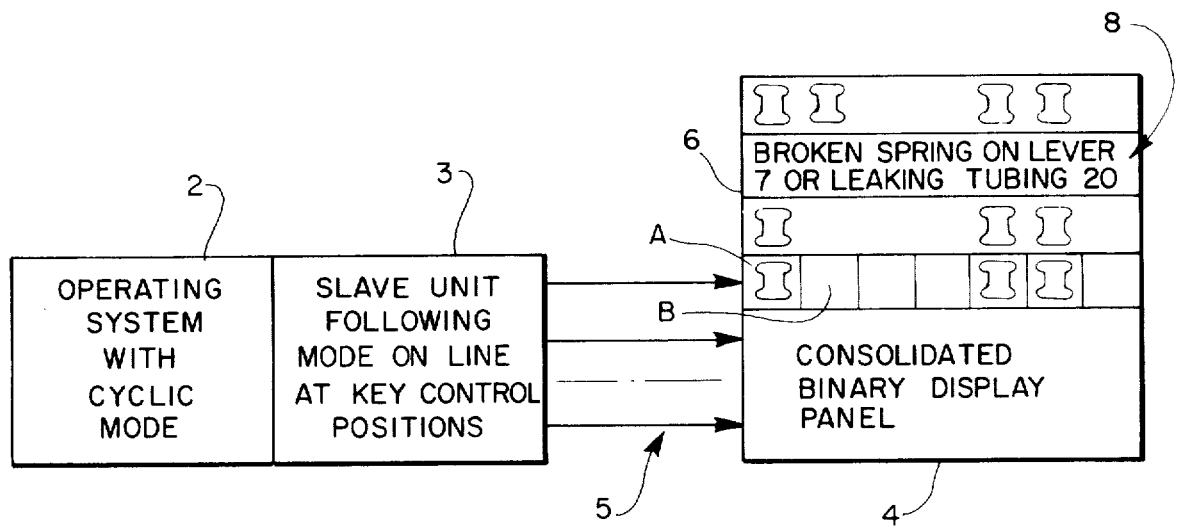

United States Patent [19]
Brouwer et al.

[11] 3,901,273
[45] Aug. 26, 1975

[54] FLUID CONTROL SYSTEM WITH ON-LINE DIAGNOSIS MEANS ISOLATING MALFUNCTIONS

[75] Inventors: Charles William Brouwer, East Greenwich; Larry Clyde Cowan, Saunderstown, both of R.I.

[73] Assignee: Leesona Corporation, Warwick, R.I.

[22] Filed: Apr. 9, 1973

[21] Appl. No.: 349,633

[52] U.S. Cl. ............ 137/552; 137/557; 137/596.15; 91/1
[51] Int. Cl.² .................................. F16K 37/00
[58] Field of Search . 137/557, 552, 596.15, 596.18; 324/51, 73; 235/92 EA, 92 PD; 340/213 Q, 225, 172.5

[56] References Cited
UNITED STATES PATENTS

| | | | |
|---|---|---|---|
| 3,016,918 | 1/1962 | Wentworth | 137/596.15 |
| 3,034,051 | 5/1962 | Higgins, Jr. | 324/73 R |
| 3,305,772 | 2/1967 | Earnhart | 324/51 |
| 3,387,084 | 6/1968 | Hinc et al. | 340/225 |
| 3,651,643 | 3/1972 | Hurrah | 137/557 X |
| 3,688,414 | 9/1972 | Koehlinger et al. | 35/13 |

FOREIGN PATENTS OR APPLICATIONS
684,548  4/1964  Canada ................ 137/596.15

*Primary Examiner*—William R. Cline
*Attorney, Agent, or Firm*—Albert P. Davis; Burnett W. Norton

[57] ABSTRACT

An on-line diagnostic system is provided working conjointly with but not interfering with the operation of a logically controlled industrial control system. Thus binary digital words are displayed at a centralized location for comparison with a scroll chart to indicate irregularities of operations by listing invalid words and to pinpoint correctional techniques with a predetermined servicing recommendation for invalid word combinations. In a preferred embodiment the system is a fluid controlled binary operated cyclic control system provided with logic elements interconnected for automatically progressing through a cyclic operation mode controlling flow paths for working fluid under pressure in a desired sequence to thereby perform a work function.

The preferred fluid logic elements comprise a compartment separated into two chambers by a flexible diaphragm which is flexed by pressure differentials to block or open fluid flow paths through the respective chambers. Binary indications as to status of these flow paths are provided as pressure readings at a plurality of key flow path positions thereby producing the binary word information specifying the nature of malfunctions.

9 Claims, 8 Drawing Figures

| | A | B | C | D | E | F | G | H |
|---|---|---|---|---|---|---|---|---|
| STATIC STATE | 1 | 0 | 1 | 0 | 1 | 0 | 1 | 1 |
| START | 0 | 0 | 0 | 1 | 1 | 1 | 0 | 1 |
| POWER STROKE | 1 | 1 | 0 | 1 | 1 | 1 | 0 | 1 |
| END OF STROKE | 1 | 1 | 1 | 0 | 0 | 0 | 1 | 1 |
| RETURN STROKE | 1 | 1 | 1 | 0 | 1 | 0 | 1 | 1 |
| MALFUNCTION-1 | 0 | 1 | 1 | | | | | |
| MALFUNCTION-2 | | | 1 | 1 | | 0 | 0 | |
| MALFUNCTION-3 | | | 1 | 0 | | 1 | 1 | |

FLUID CONTROL SYSTEM WITH ON-LINE DIAGNOSIS MEANS ISOLATING MALFUNCTIONS

This invention relates to digitally operated industrial control systems and more specifically to such systems with diagnostic aids isolating the cause of any system malfunction.

BACKGROUND OF THE INVENTION

In complex machinery such as textile machinery and spinning frames it is customary to isolate and correct system malfunctions and failures at a particular circuit element as described in the application of this assignee Ser. No. 209,774 filed Dec. 20, 1970 for Automatic Control System for Correcting Textile Machinery Malfunctions From Sensed and Stored Malfunction Data now U.S. Pat. No. 3,834,346,. However, diagnosis of the system operation and the isolation of system malfunctions are not always easy to analyze from the obvious failure of single elements. Thus, for example the system may malfunction because of a combination of conditions found at a variety of key system points. Also failure of an element in a complex system may not always be easy to detect by a single signal, and if all elements need produce a signal the system becomes complex. Thus this invention and that of the co-pending application of this assignee filed concurrently herewith, Ser. No. 349,634 for Fluid Operable Binary Control System With Diagnostic Indicators, relate to diagnosis of system malfunctions by introduction of efficient multiple signal diagnostic techniques compatible with the operation of complex mechanical systems such as found in textile machinery, for example.

In the complex mechanical and industrial system arts, it is difficult if not impossible, to provide at remote operating locations and plants qualified maintenance personnel who can analyze a malfunctioning system quickly and correct failures that may occur without down time losses. Therefore, it is desirable that such systems be provided with diagnostic aids that not only indicate that the system is malfunctioning but which will also indicate the correction procedures to take to restore the system to normal operation in a form interpretable by a non-skilled observer. In order to accomplish this it is not sufficient just to turn to prior art techniques and adopt them to existing systems, because of the need for extensive training of service personnel and other inefficiencies afforded thereby including incompatibility with the need to isolate malfunctions without increasing system loads or complexities to such an extent that reliability is reduced and malfunctions are more probable and complex than before.

One significant prior art problem is that attempts to make equipment to detect and expedite correction of failures adds complexity and cost. Thus, it is known in the art to put two systems side by side for changeover in event of failure. This requires the expensive expedient of two completely operable systems, one of which is idle for so long it may not function when needed.

Other systems incorporate diagnostic aids which add to the complexity of system design and loading. For example, in the use of relays and switching circuits where auxiliary relay circuits connected for identifying for example undesired open or shorted circuits over specified circuit paths, the extra contacts required load down the relays and make their operation less reliable. Furthermore, these types of systems provide limited information which aid the correction of only a few of the malfunctions that might occur in the selected circuit paths and are far from universal in technique or application. Normally the detection of presence of a short or ground in a selected circuit does not isolate the exact position of the fault for ready correction. Other different type of controls then must be incorporated in such prior art systems to process more generalized types of malfunctions throughout a system and to isolate the exact nature of a malfunction and its correction procedure in complex systems.

It is critical in most systems that the diagnostic equipment should be operable on-line along with the system and preferably without interference with or modification of system performance. Otherwise, intermittent type failures occurring only under operation conditions cannot be efficiently identified or isolated. Where systems are diagnosed in operation with available prior art techniques, false signals or additional failures may occur because of loading of system elements or diversion of current or fluid flow paths, etc. caused by the operation or failure of the diagnostic elements or deficiencies in the diagnostic routines. For example, the performance of a transistor generally cannot be tested in on-line operation without loading it or bypassing current flow paths so that the test is not realistic and adds to liklihood of faults.

Typical of those prior art techniques attempting to provide indication of malfunctions in a system are U.S. Pat. No. 3,305,772, R. L. Earnhart, Feb. 21, 1967 and U.S. Pat. No. 3,034,051, S. P. Higgins, Jr., May 8, 1962. However these are deficient in attaining the objectives of this invention for example since they cannot be operated on-line under normal operating conditions, and they do not identify the nature of a specific malfunction or the manner in which it is corrected.

Also techniques of fault identification as set forth in the prior art such as in Chapter 19 of the Van Nostrand Book 1951, "The Design of Switching Circuits" by Keister, Ritchie & Washburn are deficient in that the system is loaded down and made more complex by fault detectors and the nature of system fault detection is severely limited to detection of the failure of a specific element such as a relay or an unwanted ground or open circuit in a path that must pass through a series of relay contacts.

Accordingly, the prior art has been deficient in providing techniques and systems which expedite correction of malfunctions in complex systems promptly and efficiently without substantially increasing complexity, reducing reliability or changing the operational characteristics of the system.

OBJECTIVES OF THE INVENTION

It is therefore a general objective of this invention to improve the state of the art in diagnosing malfunctions of complex industrial control systems.

It is a more specific object of this invention to diagnose malfunctions continuously in an operating system without interference with or change in system operation and without significant added system complexity.

Another object of the invention is to provide diagnostic aids that isolate from on-line operational performance of a complex system specific failures and identify correction procedures therefor in a form usable by unskilled observers.

A further object of the invention is to provide improved diagnostic equipment for complex systems that is generally compatible with and adaptable to various systems to isolate many generalized types of possible malfunctions.

A still further object of the invention is to provide efficient on-line diagnostic means that will permit analysis of intermittent system conditions.

Yet another object of the invention is to provide malfunction diagnostic apparatus that produces with binary word indications at key control positions of a system a combination of signals representative of specific system malfunctions incurred during complex system operation indicative of irregular cooperation of elements in the system rather than merely failure of a single type of system failure or failure of a specific item upon which a malfunction indicator is attached.

BRIEF DESCRIPTION OF THE INVENTION

Therefore in accordance with the invention diagnostic apparatus is provided for indicating the nature of malfunctions in complex industrial control systems operating in a cyclic mode over a sequence of operational steps. A typical system embodiment is a logical control system providing a plurality of automatically sequencing control steps to control a forward-backward power stroke of a mechanism. Malfunctions are detected by designating and observing a plurality of key control positions in the system that both identify proper operation and signify the specific nature of the more probable causes of malfunction of the system. Thus binary indicators detect the individual status of two operating conditions at the key control positions. Accordingly, a visual display panel consolidates all the binary indicia in the form of a binary word which designates particular predetermined system failure conditions. By means of a scroll chart having invalid binary words accompanied by corrective instructions each invalid binary combination identifies a corresponding service operation for an isolated specific failure so that unskilled observers may expeditiously take required correctional measures to correct system malfunctions.

THE DRAWING

Figure 2:
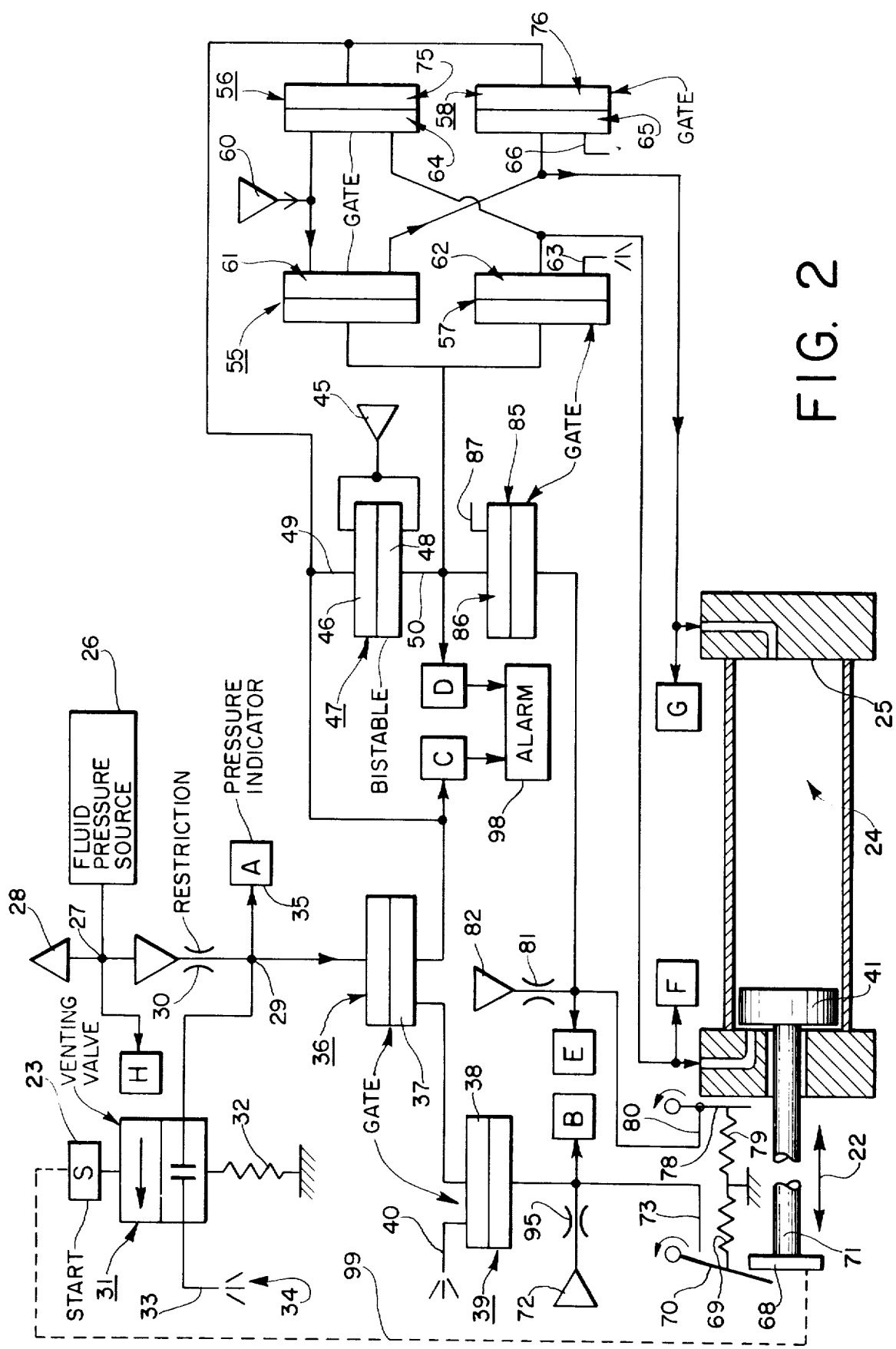
Figure 5A:
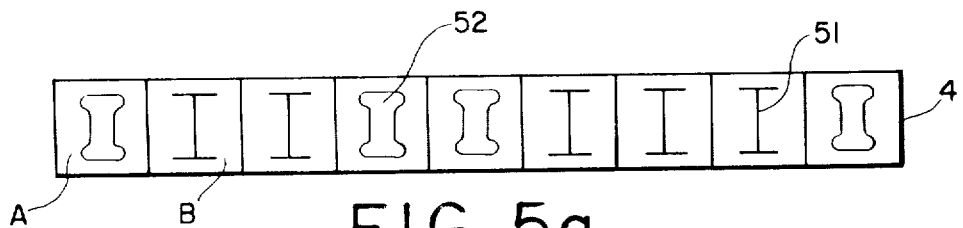
Figure 5B:
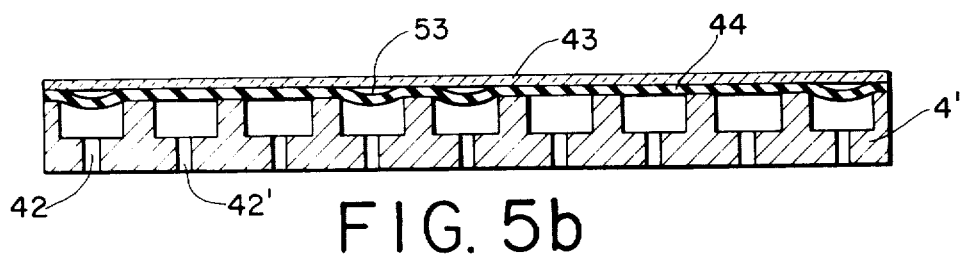
Figure 3:
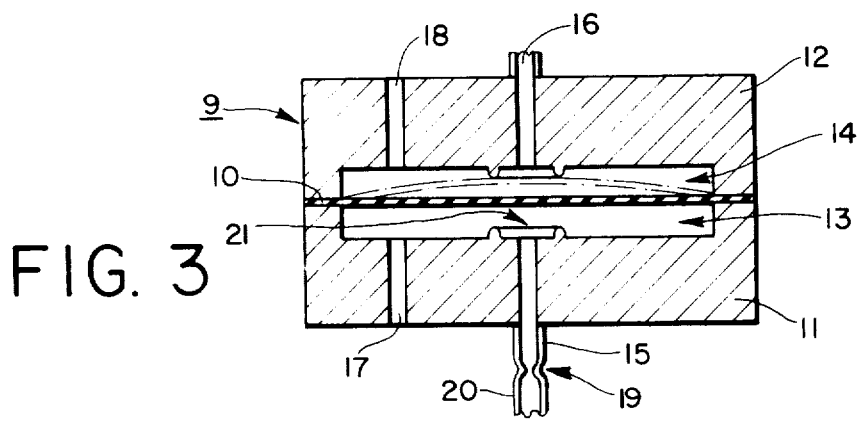
Figure 6:
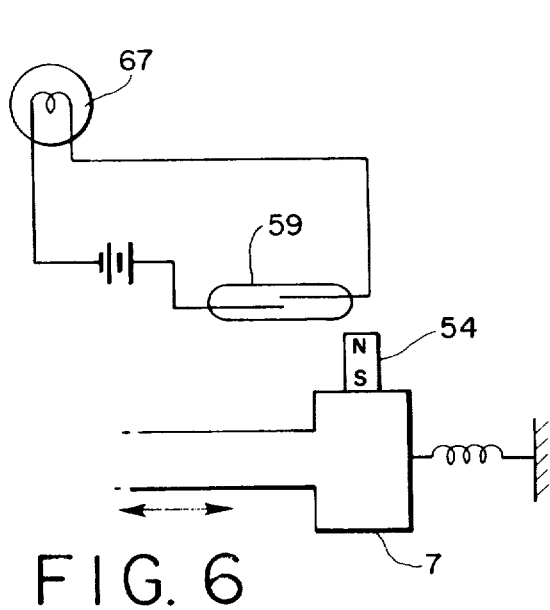
Figure 7:
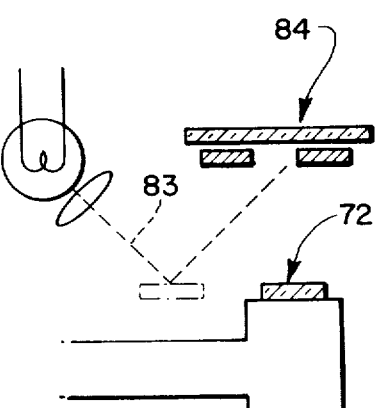

Other features, objects and advantages of the invention may be recognized from consideration of the following specification with reference to the accompanying drawing, in which:

FIG. 1 is a block system diagram indicating the nature of the invention,

FIG. 2 is a schematic system diagram of an industrial control system embodying the invention, FIG. 3 is an elevation view in section of a logic control element used in the system of FIG. 2, FIG. 4 is a chart showing in binary word form operational conditions in the system of FIG. 2, FIGS. 5A and 5B are respectively a plan and an elevation view in section of a consolidated binary display panel construction as used with the invention, and FIGS. 6 and 7 are schematic segmental views of alternative display means that may be used in accordance with the teachings of this invention.

GENERAL DESCRIPTION OF THE INVENTION

As may be seen by reference to FIG. 1, the general system organization is simplified in block diagram form. Thus the operating system 2 is an industrial control system having a complex cyclic mode of operation such as that encountered in the operation of a textile machine. Preferably as later shown in FIG. 2, the system is digitally controlled over an automatic sequence of steps by a logic network to perform a work result. Thus, for example, a prime mover power cylinder may be automatically controlled through an operational stroke.

A plurality of key system control positions is selected to identify during on-line performance of the operating system the status of the several sequential steps expected in normal operating condition. Attention is given to the choice of the location of the combination of the key control positions to provide also identification of the probable nature of specific predetermined possible malfunctions in the system. All such control positions will take at least one of two operational states during the on-line operation of the system which will permit representation in binary word form of the diagnostic information. Thus in system operation the control positions follow operation steps of the cyclic mode and the diagnostic signals are derived by a unit 3 shown adjacent to and therefore intimately connected in and with the operating system 2. As before described, this is preferably done without altering system operation in any manner and without loading or causing the system to be less reliable in its normal mode of operation. Some techniques for accomplishing this are identified hereinafter.

A consolidated binary display panel 4 has indicators A, B, etc. arranged to visually display the aforesaid operating conditions in the form of a binary word by means of signal conveying pipes or lines 5 which may permit diagnostic signal consolidation at an observation position, even at locations remote to the operating system 2 if desired. The visually displayed binary word A, B, etc. then provided identifies the specific status indicating normal operation or malfunction produced at any operational step in the control sequence of the operating system 2. Any invalid binary diagnosis word not signifying a normal operating step can identify specific types of malfunctions by selection of proper key control positions and analysis of the system operation. Thus, trouble can be quickly eliminated even by unskilled servicemen not specifically trained for or familiar with the particular system.

Accordingly, for immediate response to and correction of malfunctions indicated by invalid word combinations, a document such as scroll chart 6 may be used. The scroll chart is positioned near the display panel to identify the invalid words by side by side comparison or overlay, and each significant invalid word is accompanied by an identification 8 of the probable nature of a specific malfunction in the system causing the particular invalid binary combination presented. It is seen therefore that this invention provides digitally operated diagnostic apparatus operating on-line in an industrial control system to both designate a failure condition and the specific manner in which the failure condition is to be remedied. Further understanding of the invention may be attained from the following description of a representative detailed system embodiment shown in FIG. 2 and hereinafter described.

GENERAL DIGITAL LOGIC CONTROL OPERATION

In general, it is desirable to operate digital logic systems exclusively on a binary basis indicating no more than two logic levels, which can be sensed simply by on-off type indicators and control inputs. The present system therefore is fluid operated by a source such as compressed air and responds to two logic (and working power) levels, namely fluid at atmospheric pressures or at a predetermined source pressure above atmospheric. Logically, gating and venting of fluid at a source pressure is employed in a network of fluid flow paths and controlled by fluid operated binary logical elements. Thus, fluid flow and pressure conditions are controlled through various network paths and working power is delivered simply and efficiently to many network points at times compatible with any desired control cycle or power sequence to a wide range of compatible fluid driven mechanisms such as hydraulic or pneumatic rams, valves, machine elements, sensors of mechanism position and the like, exemplified in an embodiment of the invention hereinafter described as a movable piston 41.

A logical control device that may be universally employed in such systems as a valve, gate, decision or memory device comprises a simple inexpensive sandwich element having two hollow housing members embracing therebetween a flexible diaphragm as shown in FIG. 3. This diaphragm is positioned by differential of fluid pressure on opposite sides to block or open fluid flow paths and thus operates as a valve. Thus, the housing members each have one or more apertures for input or output of fluid on the respective sides of the diaphragm to thereby control the diaphragm and pass fluid at working or atmospheric pressure under control of fluid pressure conditions on the diaphragm. Depending upon the pressure input combinations and the nature of the apertures such elements can make decisions, store control conditions and amplify or control power flow to a load.

Thus, by binary digital logic network control of fluid pressures and flow paths at predetermined positions in a fluid flow network by said logic elements, cyclic sequences may be instituted for one or more power utilization devices in a simple, efficient, compatible, compact control system interconnection which replaces mechanical interfaces and elements in many cases, and operates in a single fluid path control mode. The system logic may thereby automatically progress through a predetermined control sequence cycle established by changes in pressure conditions and flow paths through a fluid flow path network terminating in control of power to at least one fluid operated mechanism.

Illustrative of the nature of the control systems introduced by this invention is a pneumatic control system for selectively operating on command a pneumatic piston through a single reciprocation cycle by use of a few fluid operated logical control elements to gate air above atmospheric pressure from a supply source to operate the piston and the logic control elements over the required reciprocation cycle in response to a command signal initiating the cycle. A plurality of pressure responsive binary diagnostic indicators is connected to the flow network at predetermined positions providing binary information to diagnose operations and malfunctions. Thus, a distinct binary word type response may be developed identifying each different operating step, and invalid word combinations may identify a set of specified malfunction conditions.

In FIG. 2 several of the hereinafter described logic elements seen in FIG. 3 are shown in schematic form coupled in a logic circuit combination for providing an automatic control mode sequence of operations controlling at various key circuit points A, B–G the fluid pressure and flow path configurations. A movable mechanically operable prime working device is piston 41, which may drive any corresponding mechanism desired. This piston is caused by the logic control system to move in response to a trigger input signal through one cycle from the static rest position shown to complete a reciprocation cycle as suggested by the arrow 22. A reciprocation cycle is started by a movable start lever 23, which may be mechanically or manually operated, and automatically sequences the control system through a series of control steps retracting piston 41 within cylinder 24 until it reaches the opposite end 25 and then extending the position back to the rest or static position shown without any further trigger signal.

Power for operation of the logic network and the piston 41 is derived from fluid pressure source 26 supplying air for example at 100 p.s.i. (hereinafter designated 1) at outlet position 27. The schematic triangle 28 represents the connection of this source at other system positions. For example, the source is connectd to control position 29 through resistor restriction 30, so that if the control position 29 is vented to atmosphere, the fluid pressure of source 26 is maintained at control point 27.

To start the cycle with a trigger input pulse signal the venting valve 31 is operated by means of momentarily actuated start lever 23, which may be spring biased by means 32 to return to normal position after actuation. The valve serves to vent control point 29 to atmosphere by passage 33 as suggested by the legend 34 as long as start lever 23 is depressed. Thus, the fluid at position 29 is lowered to atmospheric (hereinafter termed 0). This action is referenced in the chart of FIG. 4 for the positions A, B–H. Blocks A, etc. as designated by the pressure indicator 35 comprise indicators providing a binary reading of the pressure levels 0, 1 at the corresponding control points (29). The indicator may be of the type described in the co-pending application of this assignee, U.S. patent application Ser. No. 289,578 filed Sept. 15, 1972, now U.S. Pat. No. 3,834,046 for example, which is later described in connection with FIG. 5.

For reference, the positions of the control points A-H in the static rest condition are shown in binary form by the initial row of the diagram of FIG. 4. The binary word form changes as the control operation sequences progress.

To better understand the nature of the control system operating mode, the operation of the logic elements 36, 47 etc. may now be considered.

THE FLUID OPERATED LOGIC ELEMENTS

The structure of the basic fluid binary logic element 9 employed in this invention is illustrated in FIG. 3. Co-pending applications of the same assignee hereto, U.S. patent application Ser. No. 165,446 filed July 26, 1971, now U.S. Pat. No. 3,779,267; U.S. patent application Ser. No. 165,447 filed July 26, 1971; U.S. patent application Ser. No. 179,844 filed Sept. 13, 1971; and U.S. patent application Ser. No. 186,845 filed Oct. 6, 1971, all now abandoned, are directed to specific features of these logic elements. Basically as shown in FIG. 3, the elements are constructed of a sandwich of a flexible diaphragm 10 between two hollow housing members 11 and 12 to form two separate fluid control chambers 13, 14 on opposite sides of diaphragm 10. In FIG. 2 these logic elements 9 are shown schematically. The diaphragm 10 can assume the central unflexed position with equal pressures in both chambers 13, 14 or may assume either of two flexed positions, one being shown in phantom, thereby blocking passageways 15 or 16 respectively depending upon the differential of pressures in the two compartments 13 and 14. Auxiliary passageways 17 and 18 may be provided for further control or gating functions. Thus, for example, an air supply through passageway 15 above atmospheric pressure may be vented to the atmosphere by passageway 17 to produce a substantially atmospheric pressure level in compartment 13. Because of the path restriction means or resistance device 19, the source supply at entrance 20 will remain at above atmospheric pressure. Because of this pressure level if the air supply source at above atmospheric were coupled simultaneously to inlet passageway 16 and passageway 18 were closed or maintained above atmospheric, the pressure in chamber 14 would exceed that in chamber 13 and the diaphragm would flex to close passageway 20 by seating at position 21. This position will prevail as long as the pressure level remains in chamber 14. Thereafter a power consuming load can be operated by way of passage 18 to receive fluid under pressure flowing through the compartment 14. Thus, the element may serve as a gate for the power, or as a logic element to selectively change or store flow paths, or as a vent to the atmosphere, etc. It is to be understood that the basic element shown may be simplified by providing only part of the passageways in some applications, and may readily handle fluid under pressure of about 100 p.s.i. within a small compartment of the order of one-half inch in diameter and an eighth of an inch in depth.

DETAILED DIGITAL SYSTEM OPERATIONAL SEQUENCE

Continuing now in detail with the operation sequence in response to start lever 23, the high pressure state 1 at A is changed to 0 by the vent 33. This causes the diaphragm in gate 36 to change so that the pressure at point C goes to 0 being vented through chambers 37, 38 and vent 40.

Bistable element 47 has the source pressure maintained upon both compartments 46 and 48 by means of input point 45 unless vented through the flow network paths connected to outlet passages 49, 50. Thus, when one outlet passageway is vented or has the pressure lowered the diaphragm will move and maintain that position until a reversed pressure differential is established at passages 49, 50. Accordingly, side 48 (D) is maintained at a state opposite 46 (C) as shown by the opposite states in FIG. 4.

The pressure levels C and D accordingly control power gates 55–59 which supply fluid flow paths from source inlet point 60 to operate the piston 41 at control points F, G, which are caused thereby to undergo a similar state transition.

In the static condition shown before the start lever 23 is operated, the path of fluid under pressure from source point 60 is through chamber 61 and into cylinder 24 to maintain piston 41 at the position shown. The exhaust from cylinder 24 is vented past F and through chamber 62 to vent 63.

When the start lever 23 is operated and bistable element 47 changes state as C goes to 0 however, diaphragms in logic elements 55–58 change position and the flow of fluid under pressure from source position 60 reverses through chamber 64 and past F to tend to move piston 41 through its forward stroke toward end 25, and correspondingly vents the cylinder 24 past G and through chamber 65 and vent 66.

Each gate 55–58 operates similarly to open or close a fluid flow path through corresponding chambers 61, 62, 64 or 65. As seen in the static condition shown therefore, with C=1 and D=0, pressure on diaphragms of elements 56 and 58 will close the flow through chambers 64 and 65. Conversely the vented (0) condition at point D will permit the source 60 pressure (1) to open flow path chamber 61 of element 55. Similarly the pressure of vented fluid past G will change the diaphragm 62 in element 57 to open vent 63. Upon a change of state of bistable element 47 this procedure will reverse in a similar manner. This operational sequence serves therefore to control the stroke of piston 41 within cylinder 24 in either direction by reversing power delivery and venting past points F and G. Bistable memory logic element 47 then stores each condition until a further command is received changing the control step.

As the piston 41 moves away from its rest position, the mechanical position sensor switch 70 is actuated by means of spring 69 and the detent bar 68 moving with the piston rod 71 to move counterclockwise as indicated by the arrow, thus closing vent 73. In the static position source point 72 supplies fluid under pressure (1) and restriction resistor 95 permits point B to attain the vented atmospheric pressure 0. Thus, in FIG. 3, B changes state as the cylinder moves. Also the start lever 23 when released permits A to return to state 1.

The change of state B to 1 will cause the diaphragm of gate element 39 to change closing chamber 38 to vent 40 to condition point C for a reversal of binary state of bistable element 47. A may be returned to 1 either before or after b is changed to 1. When A goes to 1 the flow path through chamber 37 of gate 36 is closed by the higher pressure on the diaphragm at point A. However, since the flow path lines connected to C have no inlet of fluid under pressure (1) because bistable element 47 is maintained with outlet 49 blocked, C remains at 0 until the bistable element 47 reverses its condition.

As the retract piston stroke is completed, the position sensor 78 will be turned counterclockwise as the arrow shows against the bias of spring 79 to open vent 80 and cause E to go to 0, by operation of restriction resistor 81 reducing source point pressure 1 at 82 as the fluid flows through vent 80.

Since D=1 at this time the diaphragm of gate 85 will shift to open chamber 86 and vent 87 causing D to go to 0. Because the side C at outlet 49 is no longer vented this creates a pressure differential switching bistable element 47 to send C back to 1 and reversing the piston drive power from source point 60 from F to G for an extend stroke as before described. When the extend stroke starts, detent 68 moves away from vent switch 78 and vent 80 is closed again returning point E to 1. This serves to close vent 87 in element 85 and condition position D so that the bistable element 47 can be again reversed under control of a pressure change at position C.

The cycle is then completed and the static condition reinstated as the piston returns detent 68 to reopen switch 70 and vent 73 returning point B to 0. This opens vent 40 at gate 39 so that C may return to 0 when the start lever 23 opens chamber 37 for the next operation cycle.

SUMMARY OF THE OPERATION CYCLE AND FLOW PATH CONTROLS

The control system shown in FIG. 2 powered by fluid pressure source 26 automatically operates the piston 41 through one reciprocation cycle from the static position shown when start lever 23 is actuated. The operation sequence serves to change fluid flow paths and pressures at different points in the system with key control points labelled A–H and diagrammed in FIG. 4.

In the static position fluid from source 26 is vented at vent 73 from power inlet 72 until the cycle is started. Since piston 41 is at the end of the stroke, no fluid is vented past point F through chamber 62 and vent 63, nor is any fluid flowing into chamber 24 past G and chamber 61 from source point 60. Thus, power losses are slight because of resistor restriction 95.

When the start button is pushed fluid flows through restriction 30 and vent 33. Also, C is changed to 0 and fluid flows from source point 45 past C and through chambers 37, 38 out vent 40.

Also, as C goes to 0, the cylinder power stroke begins, taking fluid from source point 60 through chamber 64 and past point F until the end of the stroke opens vent 78. Vent 73 is closed as the piston moves. Temporarily at the end of the stroke until the piston stroke is reversed to reclose switch 78 fluid is vented past E from source point 82 through vent 80. The effect of switch 78 is to cause reversal of stroke by changing C to 1 and D to 0.

Upon the extend position stroke fluid from source point 60 pushes piston 41 back flowing in the path past G and through chamber 61 until the static position shown is attained.

As is noted by dotted line 99, the operation cycle may be made automatically repetitive and continuous by operating start lever 23 from the detent bar 68 of piston 21 when it has returned to the end of the cycle position indicated by the opening of switch 70.

DIAGNOSIS INDICATORS

Because of binary operation afforded by the logic elements and the fluid pressure conditions each step of the control sequence may be identified in the form of a binary word as shown in FIG. 4, where each indicator A through H will identify the pressure state 1 or 0 occurring at the indicator position. Each indicator is located at a key control point in the system to thereby provide a maximum amount of information about system status and operation with only a few diagnosis indicators. Thus, the condition at each gate or logic element need not be monitored but those at the different flow paths essential to operation and sequencing control of the system will be sufficient.

Accordingly, position A shows operation of the start control circuit, and any misfunction of vent 33 will be evident on pressure indicator A (35).

Indicator B shows closure of switch 70 and thus the movement of piston 41 away from the extend position shown.

Indicator C shows the status of the control circuits and gates 56, 58 in position for operating the power strokes of piston 41.

Indicator D shows the status of the control circuits and gates 55, 57 in position for operating the power strokes of piston 41.

Indicator E shows that the piston has attained a full forward power stroke and that the return stroke control command is given.

Indicators F and G show the power status at the piston, and indicator H shows that the supply source 26 is operable.

From these indications individually malfunctions of the various flow paths or control circuits may be analyzed at any sequence step or to ascertain conditions if the system is locked up and inoperable.

However, by supplying binary words of expected operating conditions and using a combination of indications trouble points may be pinpointed much more efficiently and effectively. This is particularly desirable when more complex control systems are used and accessibility of the circuits, elements or mechanisms is difficult, or when inoperative equipment must be quickly returned to operation.

In FIG. 4 the normal operating binary word for each normal control step is shown such as 10101011 for the static state in which the system resides as shown in FIG. 2. Thus, each step may be checked for normal operation.

To illustrate the manner of circuit diagnosis expedited by the diagnosis indicators, some of the possible malfunctions are illustrated in FIG. 4. Consider malfunction, for example with the invalid combination ABC=011. This illustrates use of a binary sub-word and any combination of the available indicators may be used for diagnosis. Smaller binary word groups such as those shown lend themselves to provide simplified special alarm conditions. When diagnosing malfunctions several sorts of disorders may occur such as leaking flow paths, blocked flow paths or inoperative logic elements.

Malfunction-1, where ABC=111 at the static condition, indicates the vent valve 73 is closed or that the piston 41 has jammed during the extend stroke.

Consider then malfunction-2, where the condition CD=11 is unusual and not normally attained in operation. This would indicate the bistable element 47 probably has a broken, unflexed or leaky diaphragm. This might further lead to the auxiliary indication FG=00 meaning no power was supplied to cylinder 24.

Investigation of malfunction-3 would show FG=11 when bistable element 47 is properly operable with C=1. Thus, improper operation of gate 56 is indicated opening a fluid path through chamber 64.

These indications illustrate the powerful diagnosis mode offered in the system by provision of the binary operation control mode, and indicators in a fluid operable system producing both logic and operation functions including power control. Troubleshooting is expedited in this manner by providing matching templates of malfunctions 1, 2, 3, etc., for identifying predetermined invalid indicator word patterns with instructions directing a repairman to the exact service routine required. As shown in FIG. 1, the template may be in scroll form for ready availability. Thus, servicing of complex equipment is possible by personnel with little training or troubleshooting expertise and a more efficient and improved control system combination is provided than heretofore available.

The system also provides for simplified automatic alarm, shutdown or correction techniques, as for example in FIG. 2 in the case of C =11 which can be easily sensed by comparison means to sound an alarm 98 or set into effect an automatically performed corrective procedure such as immediate shutdown of the system.

THE CONSOLIDATED BINARY DISPLAY PANEL

FIGS. 5A and 5B show the physical construction of a preferred display panel embodiment that may be used in a fluid operated logic system as shown in FIG. 2. The legends A, B identify corresponding binary indications of key control point status between two identifiable operating conditions, in this case for example, high working pressure of the fluid 1 or atmospheric pressure 0.

Basically the physical structure of the visual binary word display panel 4 is shown in FIG. 5B where a series of compartments are connected by way of flow lines 42 and lead tubes or lines (not shown) to the corresponding key control positions of the system as shown in FIG. 2 for example. Held tightly between a glass faceplate 43 for example and the metal or hard plastic panel block 4' is a foam sheet 44. As indicated on the panel face 4, each binary indicator section of the foam sheet has a slit 51 which is closed under low pressure 0 conditions and is opened under high pressure 1 conditions (52) when the foam becomes compressed, thereby to visually indicate the state of system pressure at a plurality of system points in combination. Physically, the foam is compressed or deformed as indicated forming an air gap 53 when a compartment is pressurized such as at input flow line 42 to make the slit open as at 52. Visual viewing may be enhanced by coating the interior of the compartment with a reflective coating and providing a contrasting outer surface on the foam layer 44. Thus a simple inexpensive indicator is formed for the fluid logic control type system that does not alter system operation or load down the system or control points, the loading effect being trivial.

It is seen similarly in FIGS. 6 and 7 that alternative type of control systems and display devices may be used in accordance with the principles of this invention either separately or in hybrid systems where it is desirable to sense for example an electrical signal or the position of a moving element and utilize the teachings of this invention in other systems and embodiments.

Thus in FIG. 6 a movable member 7 may comprise a mechanical lever or an electrically actuated contact arm or movable solenoid. A spring may be used to bias the member 7 in a preferred position. In the one case a magnet 54 may be moved with the member 7 into position to actuate a reed switch element 59 which in turn is connected in an electric circuit to light a panel light 67 and thus indicate visually the position of movable member 7 with trivial loading and therefore no interference with operation.

Similarly in FIG. 7, a mirror surface 77 may intercept (in phantom position) light beam 83 to direct it by specular reflection into light window 84 and indicate visually the movement of member 7 into a predetermined position without load or interference with system operation.

Therefore it is seen from the foregoing description of various techniques and embodiments that there is afforded by this invention a novel and useful advance in the art and the novel features of which are believed descriptive of the nature and scope of the invention are defined with particularly in the appended claims.

What is claimed is:

1. Diagnostic apparatus for indicating the nature of malfunctions in a complex system comprising in combination, an industrial control system having a plurality of fluid control elements connected to switch in response to fluid presented thereto at two different fluid pressure levels, said system providing a sequence of operational steps to produce a cyclic mode, a plurality of key control positions in said system each having a fluid signal line presenting said two different pressure levels, said plurality of positions providing together a combination of operational pressures signifying the on-line operation status of said system, detection means coupled to each said signal line for thereat following the individual status of said two operational pressure conditions during operation of the system in on-line operation of said system to thereby provide said combination of pressure conditions, and visual display means permanently carrying at least two invalid combinations of said operational pressure conditions at said key control positions forming sets of operational conditions not normally encountered in said cyclic mode and further carrying means identifying a specific predetermined malfunction in said system designated by each said invalid combination of detected on-line operational pressure conditions at said key control positions, wherein the same said fluid signal lines respond to different invalid conditions identifying different system malfunctions identified by said display means.

2. Diagnostic apparatus as defined in claim 1, wherein the means detecting said two operational conditions comprise detectors displaying a binary indicia representative of the operational condition with said detectors of a type providing substantially no loading to the system nor interference with the operating conditions.

3. Diagnostic apparatus as defined in claim 1, wherein at least a portion of said system is controlled by a logic control system wherein said control elements comprise binary operable logic elements attaining two different states and connected together to automatically sequence through a control cycle, and said means detecting the condition at control points comprise means indicating the state of at least one of said logic elements.

4. Apparatus as defined in claim 3, wherein said logic elements comprise fluid control means operable to control a fluid path in response to the logic state of the element.

5. Diagnostic apparatus as defined in claim 1, wherein the means detecting said two operational conditions comprise detectors visually displaying a binary indicia at a consolidated display panel in the form of a binary code word.

6. Apparatus as defined in claim 5, wherein said means responsive to an invalid combination of operational conditions comprise a document having thereon a preselected set of invalid binary words for comparison with the word presented at said display panel in operation of said system and including thereon a corresponding identification of the probable nature of a specific malfunction in said system resulting from the system in the condition producing the specified invalid binary words.

7. Apparatus as defined in claim 1, wherein said means detecting the status of the two operational conditions comprise a slave unit following on-line the operational sequence steps of said industrial control system to produce a consolidated visual display of said key control point operational conditions for each step in the sequence.

8. Apparatus as defined in claim 1, wherein said system control elements comprise a diversity of logic elements cooperating together in a control pattern to condition a fluid responsive load device and wherein said means responsive to at least one of said invalid combination of operational conditions specifies the concurrent improper status of at least two system logic elements during at least one operational step of said cyclic mode.

9. Apparatus as defined in claim 1, wherein said means responsive to at least one said invalid combination of operational conditions specifies the concurrent improper status of at least two system elements during at least one operational step of said cyclic mode.

* * * * *